No. 611,563. Patented Sept. 27, 1898.
W. S. & C. I. CORBY.
MACHINE FOR WORKING AND SHAPING DOUGH.
(Application filed Jan. 18, 1898.)
(No Model.) 3 Sheets—Sheet 2.
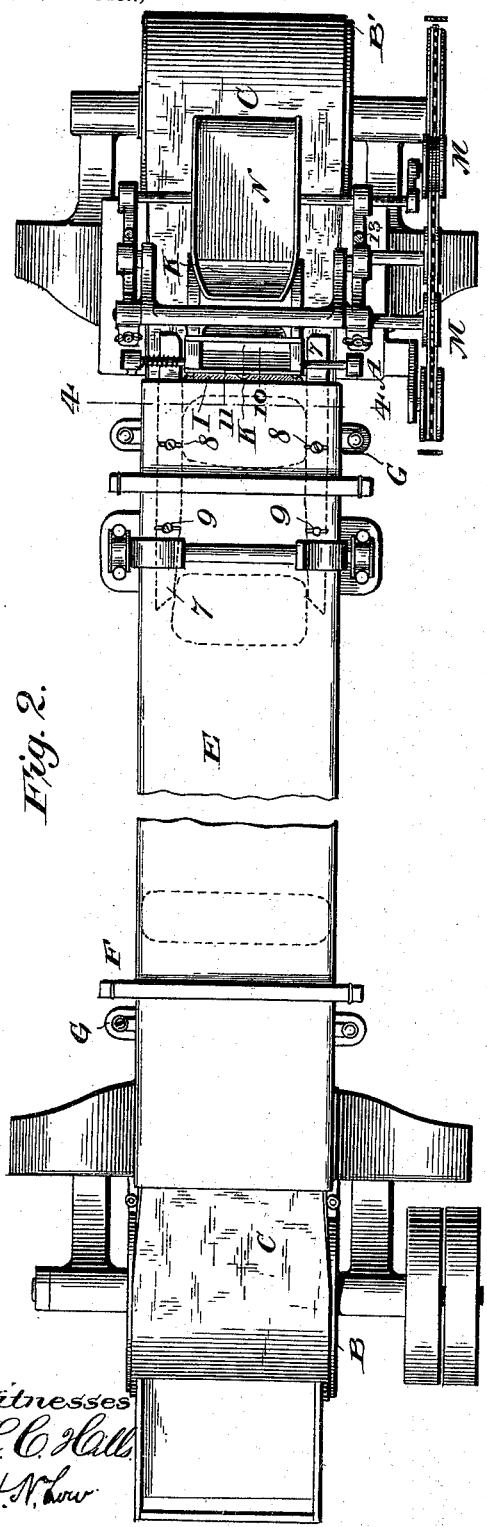
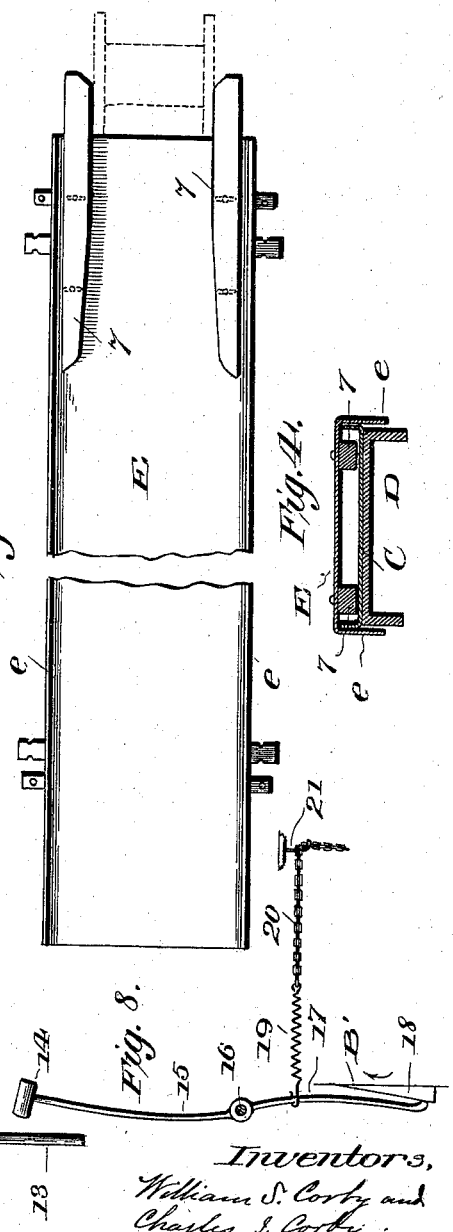
Witnesses
L. C. Hall
H. N. Low
Inventors,
William S. Corby and
Charles I. Corby.
By J. S. Barker, Atty.
THE NORRIS PETERS CO., PHOTO-LITHO., WASHINGTON, D. C.

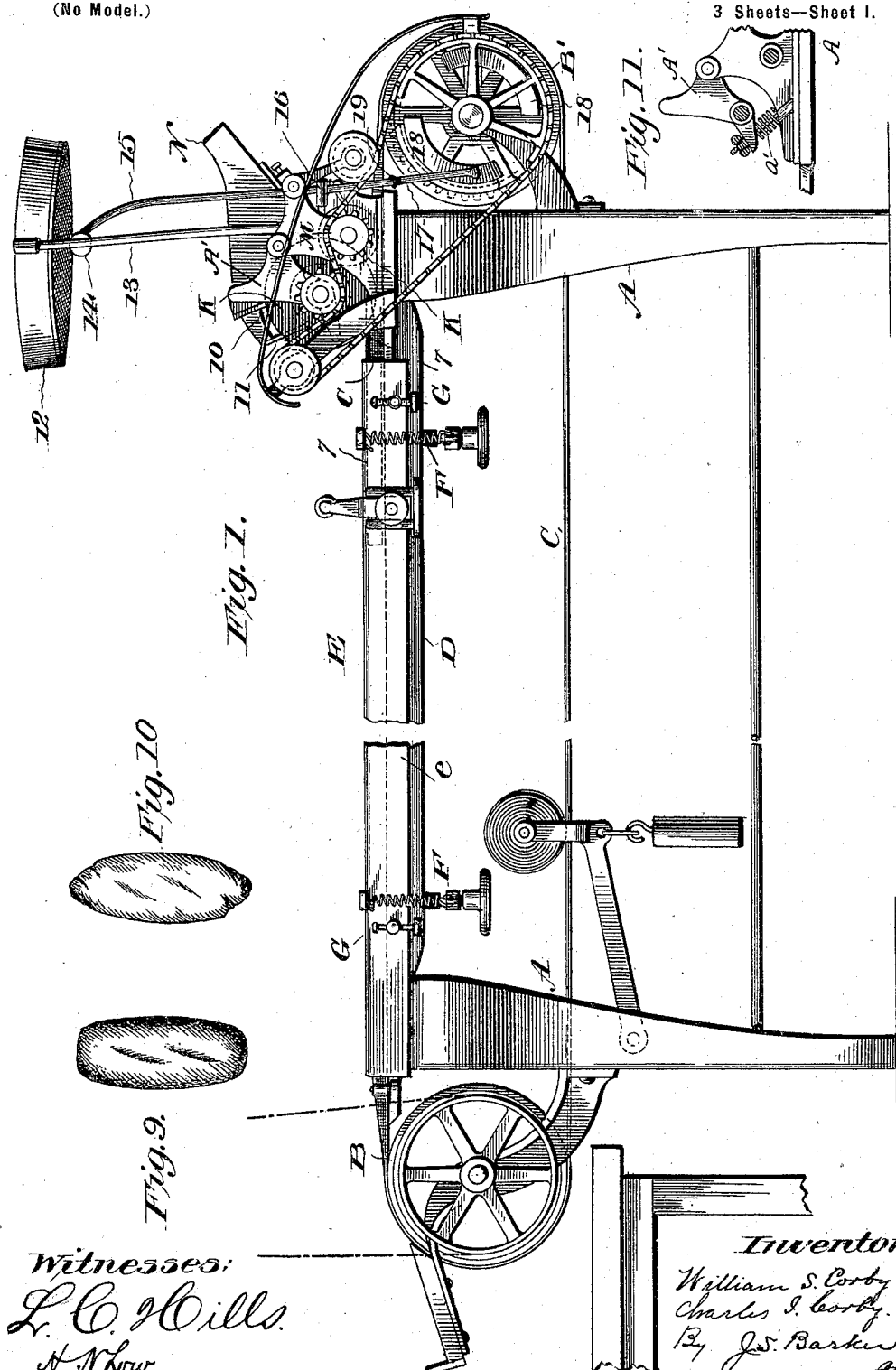

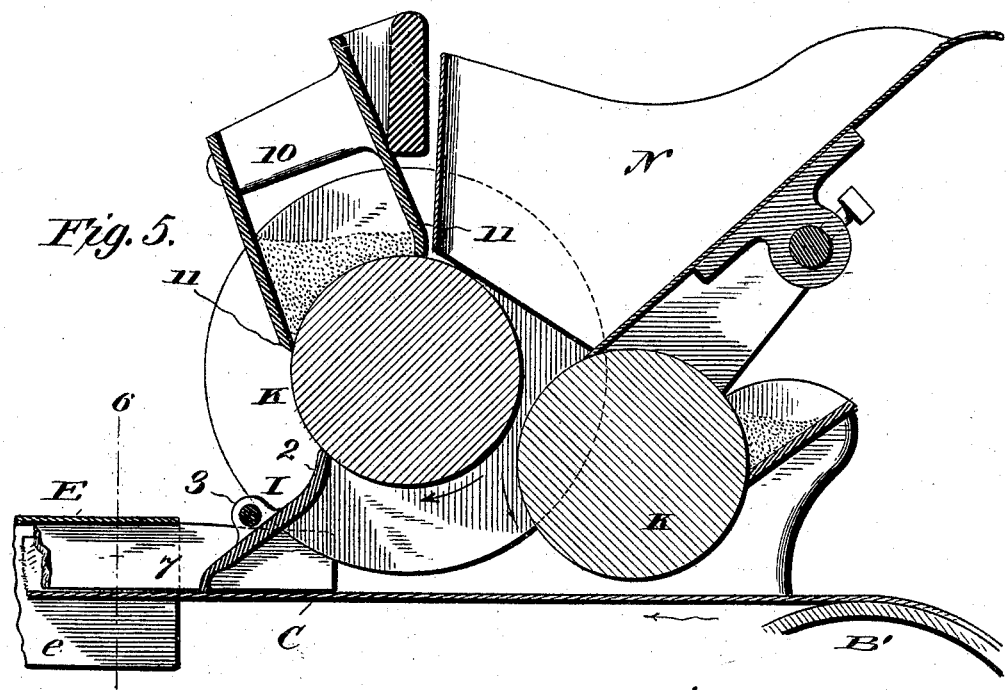

UNITED STATES PATENT OFFICE.

WILLIAM S. CORBY AND CHARLES I. CORBY, OF WASHINGTON, DISTRICT OF COLUMBIA.

MACHINE FOR WORKING AND SHAPING DOUGH.

SPECIFICATION forming part of Letters Patent No. 611,563, dated September 27, 1898.

Application filed January 18, 1898. Serial No. 667,040. (No model.)

*To all whom it may concern:*

Be it known that we, WILLIAM S. CORBY and CHARLES I. CORBY, citizens of the United States, residing at Washington, in the District of Columbia, have invented certain new and useful Improvements in Machines for Working and Shaping Dough and the Like, of which the following is a specification.

Our present invention has for its object to improve machines of the kind illustrated in our Patent No. 590,133, and dated September 14, 1897, and which are adapted for the working and shaping of dough into loaves.

Our improvements are illustrated in the accompanying drawings, wherein—

Figure 1 is a side elevation of the machine embodying our improvements. Fig. 2 is a top plan view. Fig. 3 is an inverted plan view of the pressure-board. Fig. 4 is a cross sectional view taken on the line 4 4 of Fig. 2. Fig. 5 is a vertical sectional view, enlarged, taken through the feeding-rollers. Fig. 6 is a transverse sectional view taken on the line 6 6 of Fig. 5. Fig. 7 is a vertical sectional view illustrating a different form of the curler and its shield from that shown in Fig. 5. Fig. 8 is a detail view of the means for vibrating the dusting devices. Figs. 9 and 10 illustrate loaves of bread of different shapes, hereinafter referred to. Fig. 11 is a detail view showing the yielding frame in which one of the feeding-rollers is mounted.

In its main features of construction and principle of operation the apparatus illustrated in the drawings is similar to the apparatus shown and described in the said patent, and it is not therefore necessary to enter into a detailed description of the parts which are common to the two.

In the accompanying drawings, A represents the framework of the machine; C, the traveling belt which engages with the masses of dough and assists in shaping them into loaves; B B', the rollers around which the belt runs; D, the table or support over which the belt moves between the rollers, and E the pressure board or plate arranged opposite the belt and between which and the belt the masses of dough are shaped. At the sides of the board E there are the flanges e, and the edges of the belt are turned up and run along the inner sides of the flanges. The board is furnished with spring-adjustable pressure devices F, which hold it with a yielding force toward the belt while the dough masses are passing between, and also with adjusting means, such as the screws G, whereby the pressure-board may be positively adjusted with reference to the belt.

K represents the feed-rollers, and M the gearing by which they are driven. N represents a feed board or chute arranged adjacent to the rollers K.

$i$ designates the curler, two forms being shown in the accompanying drawings, each differing somewhat from the form shown in our aforesaid patent. In the form of curler shown in the patent there was a little space left between it and the feed-rollers, and it sometimes happened that the dough would crowd through this space and over the top of the curler. We guard against this tendency by combining with the curler a plate or shield which approaches close to the face of one— the upper—of the feed-rollers, so that the dough cannot pass over the curler under any circumstances and is properly and positively directed to the curler. In the form of curler shown in Figs. 5 and 6 the shield 2, which operates to prevent the dough from getting over the curler, is made in one with the curler itself, its edge coming close to the surface of the upper feed-roller. The curler is mounted in bearings 3, so arranged that as it moves to allow the dough masses to pass under it the part 2 does not move to any considerable extent from its close relation to the surface of the feed-roller.

In the form of our invention shown in Fig. 7 the shield consists of a separate plate 4, hinged along one edge to the upper edge of the curler $i$ and having its other edge bearing against the face of one of the feed-rollers, to which it is held by a spring 6, so that it also constitutes a scraper for this roller. A rod 5 constitutes the hinge on which both the curler and the shield 4 may turn, and this is mounted in suitable bearings arranged outside of or at the ends of the rollers K.

While we have shown the shield, which prevents the dough from moving out of the path which it is desired it should take without passing under or being engaged by the curler, as being arranged close to the sheeting-rollers and in practice we prefer to so place it, yet it is apparent that the function and operation of this part of our apparatus are not dependent upon this relation or position. Indeed, this part would operate as described should the sheeting-rollers be dispensed with or applied to another machine. This shield constitutes a means which is combined with the curler and the means for advancing the dough, as the belt C, which means serve to prevent the dough from moving out of its prescribed path and thereby escaping the curler, and while we have shown such means as being in the form of a plate or shield, yet the particular shape or form of the part is immaterial, so long as it is so combined and arranged as to perform the functions described.

In operating with a machine like that shown in our aforesaid patent, wherein the dough after passing the feed-rollers and the curler is immediately free to spread out to the full width of the belt and pressure-board, it sometimes happens that the loaves formed are tapering and spiral-shaped at their ends, as represented in Fig. 10. It is desirable, however, in making certain styles of bread that the loaves should be square-ended, as represented in Fig. 9, and this we insure by arranging directly beyond the curler guides 7, which operate to prevent the dough from spreading transversely until it has been properly rolled up. These guides bearing against the dough mass at the sides cause it to become square or plane ended, which shape is retained after it passes beyond the guides and is free to spread out to the full width of the belt and pressure-board. These guides are preferably secured to the under side of the pressure-board E, which is slotted, as at 8, for the passage of the screws 9 or other means whereby the guides are secured in place. By these means the guides may be adjusted toward and from each other, so as to secure the best results. The guides need be only long enough to insure that the loaf or dough mass shall be properly rolled up into a cylindrical shape before passing beyond them.

The guides 7 might begin just in front of or beyond the curler; but we prefer that they should extend past the sides of the curler and close to the ends of the feed-rollers, because when thus extended the mass of dough as it passes from between the feed-rollers is confined between the guides at its ends, the belt at the bottom, and the curler and shield above, and a more rapid and positive feed of the dough is thus insured.

The guides besides being adjustable are also removable, so that should it be desired to make loaves with tapering ends they may be taken off. These guides, as will be observed, operate to properly center the dough while the curling and coiling or rolling up of the dough loaf is taking place.

10 represents a flour-box arranged adjacent to the upper feed-roller, Figs. 2 and 5, and having an open bottom, so that the flour placed therein may pass directly to the roller. The edge 11 of the box is arranged so close to the surface of the roller that it operates to regulate the amount of flour which may pass to the roller.

We have combined with the dough working and shaping machine a flour-dusting device, which we will now describe. (See Figs. 1 and 8.)

12 represents a flour-receptacle, such as a pan, having its bottom minutely perforated. This receptacle is mounted at the feed end of the apparatus, over the feed-rollers, the feed-board N, and the belt C, so that these parts are dusted or sprinkled with flour as it is sifted through the bottom of the receptacle 12. The receptacle for the flour is arranged to be jarred intermittently as the machine is in operation, and to this end it is mounted upon resilient supports, such as the rods 13, and a tappet or hammer 14 is arranged to strike one of the rods. The hammer is carried by a rod 15, which is connected with a bearing or pivotal support 16, mounted on a suitable part of the framework of the machine. A contact rod or arm 17 is connected with the bearing 16 and is so disposed as to be acted upon by cams or projections 18, carried by one of the turning-rollers B' for the belt. The weight of the hammer will normally hold it away from the rod 13, with which it is adapted to engage; but opposed to this action of gravity is a spring 19, connected with which are means for adjusting the effective force of such spring, such means being represented as a chain 20 and hook 21, with which the chain is adapted to engage. It will be seen that as one of the projections 18 comes into engagement with the arm 17 the hammer is swung away from the rod 13 and the spring 19 is put under additional tension, and that as soon as the projection advances beyond the reach of the arm the spring throws the hammer forward, so that a blow is struck against the supporting-rod 13 and the pan 12 jarred, the force of the blow depending on the force of the spring. Other means might be employed for effecting the jarring of the flour-receptacle; but that which we herein show has been found to be effective and satisfactory in operation.

The shaft of the upper feed-roller is preferably mounted in swinging side frame-pieces A', (see Figs. 1 and 11,) so that such upper roller may yield or move away from the lower roller should a hard unyielding substance from any cause be carried between such rollers. We prefer to hold the upper roller toward the lower one by a spring $a'$.

We are aware of the fact that prior to the date of this patent other means than those shown herein for working the dough masses were well known in the art and recognized as the mechanical equivalents of the endless belt and flat pressure-board which we have shown and described. For instance, a drum or wheel has been employed as the means for advancing the dough through the passage wherein it is worked, and a curved shoe or plate opposed to the periphery or face of such wheel and substantially parallel thereto has been used as a pressure-board, an example of a machine embodying these elements being shown in Patent No. 57,908 to W. Hotine, dated September 11, 1866. We therefore wish it understood that we claim the improvements herein described whether applied to the particular form of machine illustrated herein or to other forms of dough molding or working machines to which they are applicable, and which include means for advancing a dough mass through a dough-working passage and a resistance board or device opposed to the dough-advancing means.

Having described our invention, what we claim, and desire to secure by Letters Patent, is—

1. The combination with the traveling belt, the opposing pressure-board, and the curler, of a shield arranged adjacent to the curler to prevent the material from working over the curler, substantially as set forth.

2. The combination with the traveling belt, the opposing pressure-board, the feed-rollers and the curler, of a shield arranged between the curler and the feed-rollers, substantially as set forth.

3. The combination with the traveling belt, the opposing pressure-board, the feed-rollers and the curler, of a shield arranged between the rollers and the curler and having its edge bearing on one of the rollers whereby it operates both as a shield to prevent the material from working over the curler, and also as a scraper for the roller, substantially as set forth.

4. The combination with means for advancing a sheet of dough, and a pressure-board, of a curler, and means arranged adjacent to the curler and operating to prevent the dough from moving out of its prescribed path and thereby escaping the curler, substantially as set forth.

5. In a machine for working dough, the combination of the dough sheeting and feeding rollers, a curler arranged to engage with the forward edge of the dough, and move toward and away from the dough-path, means arranged between the curler and the feeding-rollers and adapted to prevent the dough from moving out of its prescribed path and thereby escaping the curler, and means for advancing the dough, substantially as set forth.

6. The combination of the rollers for forming the dough into sheets, means for advancing such sheets of dough, the pressure-board, a curler, side guides arranged between the rollers and the curler, and means for preventing the dough from moving out of its prescribed path and escaping the curler, substantially as set forth.

7. In a machine adapted to shape dough the combination with a traveling belt and an opposing pressure-board, of guides 7 arranged near the feed end of the machine, and adapted to engage with the ends of the masses of material being treated, substantially as set forth.

8. In a machine adapted to shape dough, the combination with a traveling belt, and an opposing pressure-board, of a curler near the feed end of the machine, and guides 7 for the ends of the dough masses, extending beyond the curler in the direction of the movement of the belt, substantially as set forth.

9. In a machine adapted to shape dough, the combination with a traveling belt, and an opposing pressure-board, having side flanges, of the guides 7 secured to the pressure-board inside of the said flanges, and near the feed end thereof, substantially as set forth.

10. In a machine adapted to shape dough, the combination of a traveling belt, a pressure-board, E opposed thereto and having side flanges e, guides 7 secured to the board between the flanges e, and means for adjusting and securing such guides, substantially as set forth.

11. In a machine adapted to shape dough, the combination of means for advancing the masses of sheeted dough, a pressure-board opposite thereto, a curler, and means arranged to properly center the masses of dough as they enter the space between the said pressure-board and the means for advancing them, substantially as set forth.

12. In a machine for making bread-loaves of dough, the combination of means for advancing the dough masses, a pressure-board, a curler, and guides arranged to engage with the side edges of the dough masses and prevent them from unduly spreading while they are being first curled and rolled or coiled up, substantially as set forth.

13. In a machine adapted to shape dough, the combination of a traveling belt, an opposing pressure-board, feed-rollers, a curler in advance of the feed-rollers, and guides 7 extending from the sides of the feed-rollers past and beyond the curler, substantially as set forth.

14. The combination of means for advancing the dough mass, a pressure-board, a curler, and a shield separate from the curler and arranged to prevent the dough from moving out of its prescribed path and escaping the curler, substantially as set forth.

15. The combination of sheeting-rollers, a curler, a belt for moving the sheet of dough from the rollers to the curler, a shield independent of the curler and arranged to prevent the dough sheet from moving out of its prescribed path and escaping the curler, and means for molding the dough mass into a loaf after it has been acted on by the curler, substantially as set forth.

16. The combination with means for advancing a mass of dough and a pressure-board opposed thereto, these parts being separated, whereby there is a dough-passage between their working faces, of a curler situated near the entrance to such passage, means for feeding sheets of dough to the curler, and a shield arranged adjacent to the feed end of the pressure-board to prevent the dough masses from passing over the pressure-board and thereby failing to enter the space between it and the means for advancing and working the dough, substantially as set forth.

WILLIAM S. CORBY.
      CHARLES I. CORBY.

Witnesses:
 J. S. BARKER,
 GEORGE T. MAY, Jr.